(12) United States Patent
Baranton et al.

(10) Patent No.: US 12,044,902 B2
(45) Date of Patent: Jul. 23, 2024

(54) SYSTEM AND METHOD FOR DETERMINING AT LEAST ONE FEATURE OF AT LEAST ONE LENS MOUNTED IN A SPECTACLE FRAME

(71) Applicant: Essilor International, Charenton-le-pont (FR)

(72) Inventors: Konogan Baranton, Charenton-le-pont (FR); Dikai Niu, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 248 days.

(21) Appl. No.: 17/626,984

(22) PCT Filed: Jul. 2, 2020

(86) PCT No.: PCT/EP2020/068596
§ 371 (c)(1),
(2) Date: Jan. 13, 2022

(87) PCT Pub. No.: WO2021/008876
PCT Pub. Date: Jan. 21, 2021

(65) Prior Publication Data
US 2022/0252905 A1      Aug. 11, 2022

(30) Foreign Application Priority Data

Jul. 18, 2019  (EP) .................................... 19315073

(51) Int. Cl.
G02C 13/00      (2006.01)
G06T 7/13       (2017.01)
G06T 7/521      (2017.01)
G06T 7/60       (2017.01)
G06T 7/73       (2017.01)

(52) U.S. Cl.
CPC .............. *G02C 13/005* (2013.01); *G06T 7/13* (2017.01); *G06T 7/521* (2017.01); *G06T 7/60* (2013.01);
(Continued)

(58) Field of Classification Search
CPC ......... G02C 13/005; G06T 7/13; G06T 7/521; G06T 7/60; G06T 7/73; G06T 2207/10012; G06T 2207/30041; G06T 2207/30201
(Continued)

(56) References Cited

U.S. PATENT DOCUMENTS

2013/0088490 A1* 4/2013 Rasmussen ........... G06T 19/006
                                                    345/421
2015/0055086 A1* 2/2015 Fonte ..................... G06F 16/22
                                                    700/98

(Continued)

FOREIGN PATENT DOCUMENTS

WO    WO 2017/138004 A1    8/2017
WO    WO 2017/162329 A1    9/2017

OTHER PUBLICATIONS

International Search Report mailed on Sep. 25, 2020 in PCT/EP2020/068596 filed on Jul. 2, 2020 (3 pages).
(Continued)

*Primary Examiner* — Tung T Vo
(74) *Attorney, Agent, or Firm* — Oblon, McClelland, Maier & Neustadt, L.L.P.

(57) ABSTRACT

A system, method, and computer readable medium for determining at least one feature of at least one lens mounted in a spectacle frame. The system includes a non-point light pattern generating device configured to generate a predefined non-point light pattern, and arranged to have the predefined non-point light pattern reflected on the at least
(Continued)

one lens, an image acquisition device configured to acquire an image of the spectacle frame including an image of the reflected non-point light pattern, and a processing unit configured to determine at least the contour of the at least one lens in function of at least one feature of the image of the reflected non-point light pattern.

14 Claims, 3 Drawing Sheets

(52) U.S. Cl.
CPC ...... *G06T 7/73* (2017.01); *G06T 2207/10012* (2013.01); *G06T 2207/30041* (2013.01); *G06T 2207/30201* (2013.01)

(58) Field of Classification Search
USPC .......................................................... 348/46
See application file for complete search history.

(56) References Cited

U.S. PATENT DOCUMENTS

| | | | |
|---|---|---|---|
| 2016/0299360 A1* | 10/2016 | Fonte | G02C 7/028 |
| 2016/0327811 A1* | 11/2016 | Haddadi | G02C 13/005 |
| 2018/0017815 A1* | 1/2018 | Chumbley | G02C 7/027 |
| 2019/0108687 A1* | 4/2019 | Kelly | G02C 13/005 |
| 2020/0072702 A1* | 3/2020 | Gamliel | G01M 11/0278 |
| 2020/0233202 A1* | 7/2020 | Derakhshani | G06T 7/586 |
| 2021/0088811 A1* | 3/2021 | Varady | G02C 13/005 |
| 2023/0034573 A1* | 2/2023 | Mizuno | G01M 11/0264 |

OTHER PUBLICATIONS

Extended European Search Report issued on Jan. 24, 2020 in Europe Patent Application No. 19315073.7 filed on Jul. 18, 2019 (9 pages).

Knauer et al., "Phase Measuring Deflectometry: a new approach to measure specular free-form surfaces", Proceedings of SPIE, Sep. 10, 2004, XP055118189, vol. 5457, pp. 366-376.

Geng, "Structured-light 3D surface imaging: a tutorial", Advances in Optics and Photonics, Mar. 31, 2011, XP055556182, vol. 3, No. 2, pp. 128-160.

"ImpressionIST—Das 4-in-1 Integrierte Service-Terminal von Rodenstock", Deutsche Optiker Zeitung, Jan. 1, 2006, XP000962763, pp. 56-61.

Combined Chinese Office Action and Search Report issued Dec. 26, 2023, in corresponding Chinese Patent Application No. 202080051919.7 (with English Translation), 17 pages.

\* cited by examiner

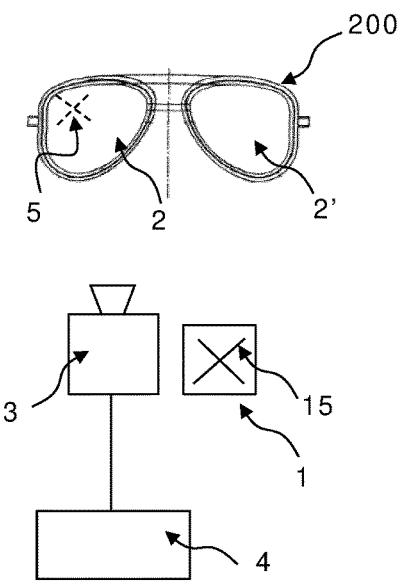
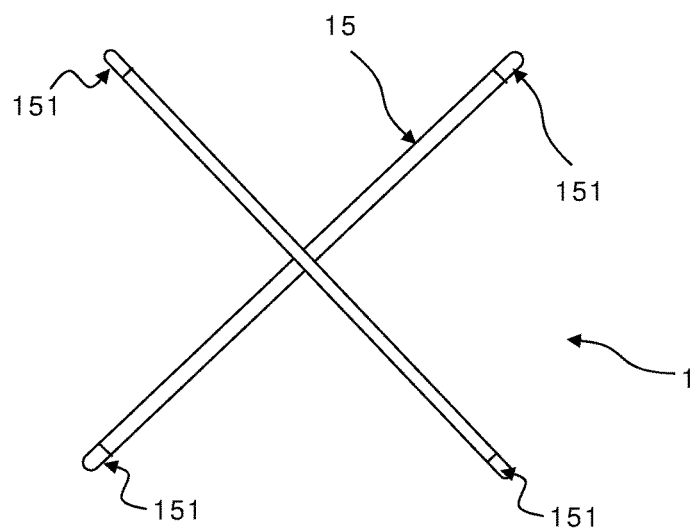
FIG.1
FIG.2

SYSTEM AND METHOD FOR DETERMINING AT LEAST ONE FEATURE OF AT LEAST ONE LENS MOUNTED IN A SPECTACLE FRAME

FIELD

The disclosure relates to the field of spectacles.

The disclosure concerns more specifically a system for determining at least one feature of at least one lens mounted in a spectacle frame. The disclosure further concerns a method and a computer program for said determination.

BACKGROUND

When an individual needs spectacles, he usually goes into an optical shop where he can choose a spectacle frame. The spectacle frame is provided with neutral demonstration lenses. An operator has to take measures related to the neutral demonstration lenses mounted in the spectacle frame to order ophthalmic lenses with features adapted for the mounting of said ophthalmic lenses in the spectacle frame. Obtained measurement data, such as the contour and the shape, are then used for reproduction purpose by machining corresponding ophthalmic lenses, with a machine like a grinder.

To this end, it is known a system, referred as Visioffice (trademark) from company Essilor, that is used to help the operator make said measurements. The operator puts clips on the spectacle frame of the individual and acquire a digital image of the spectacle frame, worn by the individual, that is provided with the neutral demonstration lenses.

Based on the acquired digital image, the operator proceeds to various measurements using a software to manually define on the image points corresponding to the alleged contour of each lens and to determine shape and positions related features of the lenses based on the measurements related to the clips.

However, these operations may be fastidious in particular for the operator and difficulties may arise for measuring the contour or shape of a lens and/or a spectacle frame. For rimless glasses, the operator that uses the software is facing difficulties to reliably identify the contour of a lens.

The purpose of the disclosure is to provide a solution to at least part of the defects in prior art. According to a particular aspect, a purpose is to provide a system and method for reliably and efficiently determine at least one feature of at least one lens mounted in a spectacle frame.

SUMMARY

To solve this problem, it is proposed a system for determining at least one feature of at least one lens mounted in a spectacle frame, said system comprising:
- a non-point light pattern generating device configured for generating a predefined non-point light pattern, and arranged for having said predefined non-point light pattern reflected on said at least one lens,
- an image acquisition device configured for acquiring an image of the spectacle frame including an image of the reflected non-point light pattern, and
- a processing unit configured for determining at least the contour of said at least one lens in function of at least one feature of the image of the reflected non-point light pattern.

Having a reflected non-point light pattern on one or both lenses mounted in the spectacle frame and processing a corresponding acquired image of said reflected non-point light pattern, enable to determine one or more features of said one or both lenses in a simple, reliable and efficient way.

As explained hereafter, points of the contour of a lens (contour of the front face and/or contour of the rear face of the lens) can be determined by identifying the location of a discontinuity or rupture in the reflected non-point light pattern. Furthermore, the shape of a lens can also be determined based on the reflected non-point light pattern by comparing it with the original generated non-point light pattern.

The determined data related to the lenses mounted in the spectacle frame enable also to determine data related to the spectacle frame itself. Such data can be useful when the data of the spectacle frame are unknown. These data can be taken into account when machining the corresponding ophthalmic lenses so as to enable an appropriate mounting of the machined lenses in the spectacle frame.

According to a particular aspect, the system can be configured to automatically calculate the 3D contour of a lens, for instance by using Fourier descriptors.

Such system makes it easier and more reliable the ordering of ophthalmic lenses for a new spectacle frame. The system can thus be easily and rapidly used in an optical store with low cost. The system can also be used for an on-line shopping application, for instance when the system is included in a mobile or home computing device, which makes it possible for customers to easily find the suitable lenses.

According to a particular aspect, said at least one feature of said at least one lens is at least one parameter among a group of parameters comprising a geometrical parameter, an optical parameter, and a fitting parameter.

According to an embodiment, the predefined non-point light pattern is a cross.

According to another embodiment, the predefined non-point light pattern has a closed shape.

According to an embodiment, the predefined non-point light pattern has at least one extremity or outer surface whose color differs from another part of the predefined non-point light pattern.

According to a particular aspect, the processing unit is configured for:
- comparing the shape of the image of the reflected non-point light pattern with the shape of the predefined non-point light pattern,
- determining the shape of at least one face of said at least one lens in function of the result of the comparison.

According to an embodiment, the system comprises a device for making the reflected non-point light pattern move relatively to said at least one lens so as to take a plurality of positions. The image acquisition device is configured to acquire a sequence of images corresponding to said plurality of positions. The moving of the reflected non-point light pattern can also be obtained by a moving of the head. A plurality of images can be acquired according to a plurality of positions of the head.

Having a plurality of images corresponding to different positions of the reflected non-point light pattern can be useful to reliably reconstruct a 3D model of one or both lenses.

According to a particular aspect, the non-point light pattern being reflected by said at least one lens and by another lens of the spectacle frame, the processing unit is configured for determining at least one relative position parameter of the two lenses of the spectacle frame in function of at least one feature of the image of the reflected non-point light pattern.

According to a particular aspect, the acquired image is processed in a blue color channel.

According to an embodiment, the system includes a 3D optical head scanner, and the processing unit is configured to control the 3D optical head scanner to execute a first scanning operation of the head of an individual that does not wear the spectacle frame to acquire a first image, and a second scanning operation of the head of the individual that wears the spectacle frame to acquire a second image. The processing unit is configured to determine at least one feature related to the position of at least one eye of the individual relatively to the corresponding lens of the spectacle frame in function of the first and second images.

It is also proposed a mobile device that includes a system as proposed above.

It is also proposed a method for determining at least one feature of at least one lens mounted in a spectacle frame, wherein said method comprises:
generating a predefined non-point light pattern,
making said predefined non-point light pattern reflect on said at least one lens,
acquiring an image of the spectacle frame including an image of the reflected non-point light pattern, and
determining with a processing unit at least one feature of said at least one lens in function of at least one feature of the image of the reflected non-point light pattern.

According to one embodiment, said at least one lens includes a neutral lens.

According to another embodiment, said at least one lens includes an ophthalmic lens.

According to a particular aspect, determining at least one feature of said at least one lens includes determining the contour of said at least one lens.

According to another particular aspect, determining at least one feature of said at least one lens includes determining the shape of said at least one lens.

According to an embodiment, the method is executed in a configuration wherein the spectacle frame is worn by an individual. The method can be executed in a configuration wherein the individual keeps his head in an orthostatic position.

According to an embodiment, the method further includes determining at least one feature of the spectacle frame in function of at least one feature of the image of the reflected non-point light pattern.

According to an embodiment, it is proposed to move the non-point light pattern that is reflected by the lens, according to a predefined path relatively to said at least one lens of the spectacle frame, so that the reflected non-point light pattern takes a plurality of positions over time. Movement can be combined with acquisition of a plurality of said image of the spectacle frame including an image of the reflected non-point light pattern, according to said plurality of positions of the reflected non-point light pattern.

According to an embodiment wherein two lenses are mounted in the spectacle frame and said predefined non-point light pattern is a single predefined non-point light pattern, said image of the reflected non-point light pattern has one part corresponding to the reflection of the predefined non-point light pattern on one of the lenses mounted in the spectacle frame, and another part corresponding to the reflection of the predefined non-point light pattern on the other lens mounted in the spectacle frame.

According to another embodiment, wherein two lenses are mounted in the spectacle frame and said predefined non-point light pattern including a first predefined non-point light pattern and a distinct second predefined non-point light pattern, the image of the reflected non-point light pattern has one part corresponding to the reflection of the first predefined non-point light pattern on one of the lenses mounted in the spectacle frame, and another part corresponding to the reflection of the distinct second predefined non-point light pattern on the other lens mounted in the spectacle frame.

According to embodiments, said method includes determining the surface features of at least one of the front face and the rear face of said at least one lens.

It is also proposed a non-transitory computer-readable carrier medium storing a program which, when executed by a computer, causes the computer to carry out the method as proposed above.

It is also proposed a computer program comprising software code adapted to perform steps of a method as recited above, when executed by a processor.

This summary does not list all necessary characteristics, and therefore, sub-combinations of these characteristics may also constitute an invention.

DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIG. 1 is a schematic view of spectacles arranged with a system according to one embodiment, for determining one or more features of one or both lenses of the spectacles;

FIG. 2 is a view of a non-point light pattern generating device for a system according to one embodiment;

DETAILED DESCRIPTION OF EMBODIMENTS

Figure 3:
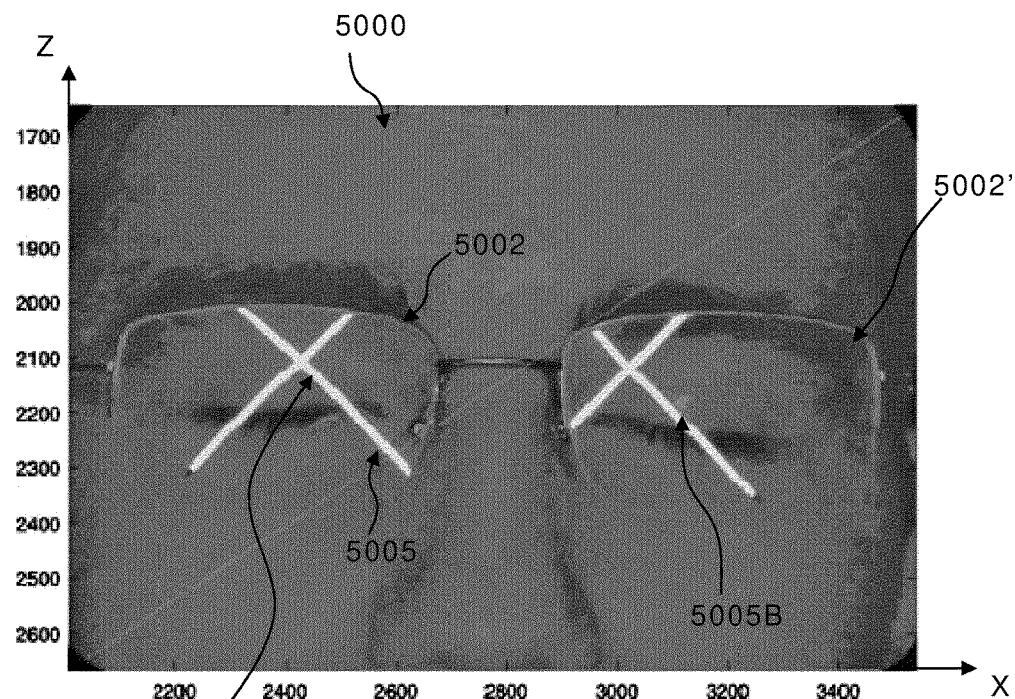
FIG. 3 is a view in a plan XZ of an image acquired with a system according to one embodiment, the acquired image including an image of a spectacle frame worn by an individual along with an image of a reflected non-point light pattern on lenses mounted in the spectacle frame.

Elements in the figures are illustrated for simplicity and clarity and have not necessarily been drawn to scale. For example, the dimensions of some of the elements in the figure may be exaggerated relative to other elements to help improve the understanding of the embodiments of the present disclosure.

FIG. 1 shows a system according to one embodiment that enables to determine one or more features of one or two lenses 2, 2' mounted in a spectacle frame 200. Each lens 2, 2' is mounted in a corresponding lens receiving location of a spectacle frame 200.

According to embodiments and as detailed hereafter, said one or more features that can be determined with the system, includes geometrical parameter(s), optical parameter(s), and/or fitting parameter(s). Fitting parameter(s) can include the inter-pupillary distance or a pupil distance with reference to the optical or geometrical center of a lens or a pupil distance with regard to a reference part of the spectacle frame, such as the bottom of the spectacle frame. The fitting parameter(s) can also include an angle orientation of said lens or of both lenses, one with regard to the other, such as the wrap angle of the pantoscopic angle.

Said one or more features can be one or more feature of the front face and/or the rear face of a lens.

In the following, explanations and features are discussed for one lens, such as lens 2, but this also applies to a plurality of lenses, such as the two lenses 2, 2' as illustrated at FIG. 1. Furthermore, determining one or more features related to one lens or both lenses can also enable to determine one or more features of the spectacle frame itself, and for instance to determine one or more features of the corresponding receiving locations of the spectacle frame intended to receive the lenses.

Non-Point Light Pattern Generating Device

A non-point light pattern generating device 1 is configured for generating a predefined non-point light pattern 15. The non-point light pattern generating device 1 is arranged with regard to the spectacle frame 200 so that said predefined non-point light pattern 15 is reflected on lens 2. As a result, it is provided on said lens 2 a reflected non-point light pattern 5.

The non-point light pattern generating device 1 has a non-point (non-directive) light source. The generated predefined non-point light pattern 15 can has one, two or three dimensions. The generated predefined non-point light pattern 15 has a predefined contour, predefined dimensions and predefined shape.

An example of a non-point light pattern generating device 1 is provided at FIG. 2. According to this example, the predefined non-point light pattern 15 has a cross shape. To this end, the non-point light pattern generating device 1 can comprise neon tubes, for instance of 1.2 meters, arranged in a cross shape.

According to other embodiments, the predefined non-point light pattern has a closed shape. The predefined non-point light pattern can have a closed round shape, such as a circle or an oval (i.e. ellipse). Preferably, in case of a closed shape, the predefined non-point light pattern is of the annular type, such as a circle rather than a disk, to have contrast between the skin of the head of the wearer and the reflected non-point light pattern.

The predefined non-point light pattern 15 may have at least one extremity 151 or outer surface, in case of a closed shape, whose color differs from another part of the predefined non-point light pattern 15. Such color difference enables to reliably identify the extremity or outer surface of the reflected non-point light pattern on the lens. According to embodiments, the extremity is of a color, for instance blue, that differs from the color of the main part of the luminous pattern.

Image Acquisition Device

An image acquisition device 3 is configured for acquiring an image 5000 of the spectacle frame 200 provided with the two lenses 2, 2'. The image acquisition device 3 can be a digital camera that provides a digital image to a processing unit 4.

As illustrated in the embodiment of FIG. 3, the acquired image 5000 includes an image 5005 of the reflected non-point light pattern 5.

Figure 4:
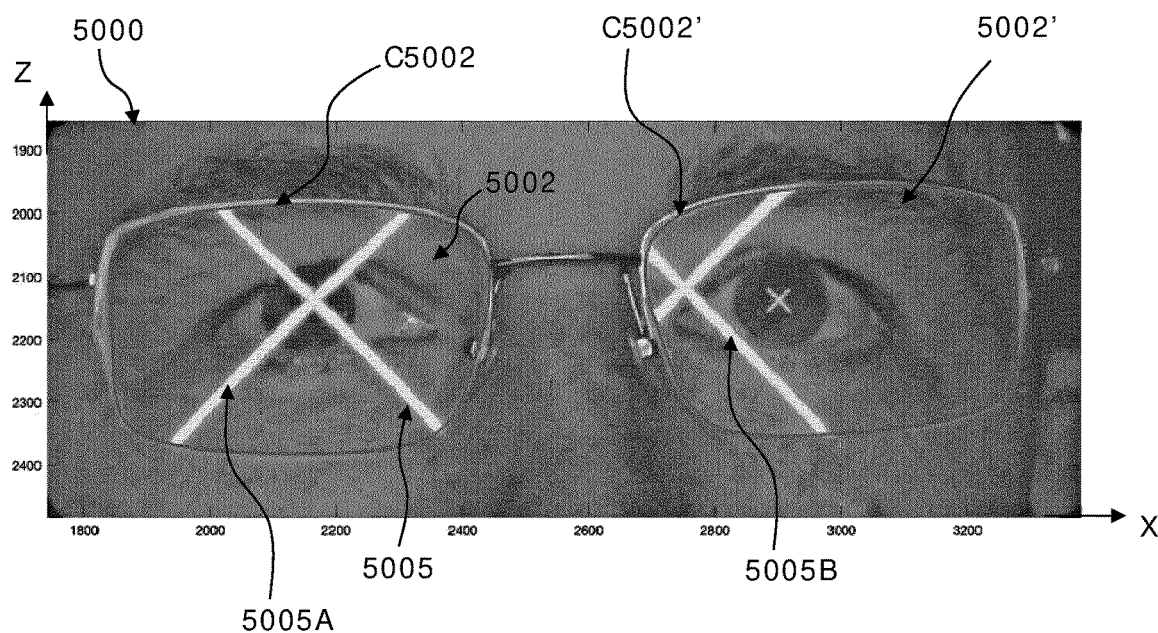
FIG. 4 is a view in a plan XZ of another image acquired with a system according to one embodiment, said another acquired image including an image of a spectacle frame worn by an individual along with an image of a reflected non-point light pattern on lenses mounted in the spectacle frame, wherein the contour of the lenses have been determined using the system and have been superimposed on the images of the lenses.

As detailed for the acquired image of FIG. 4, the image 5005 of the reflected non-point light pattern 5 can include a part 5005A that corresponds to a reflection of the non-point light pattern on lens 2 and a part 5005B that corresponds to a reflection of the non-point light pattern on lens 2'.

At FIGS. 3 and 4, the images of the lenses 2, 2' that are included in acquired image 5005 are respectively referenced 5002 and 5002'. At FIG. 4, the contour of each lens 2, 2' determined by the system has also been superimposed on the image of the corresponding lens. Superimposed contours are referenced C5002 and C5002'.

The image 5005 of the reflected non-point light pattern 5 can include a portion that is reflected on the front face of a lens and another portion that is reflected on the rear face. Discrimination and processing of these portions can be used to determine one or more features related to the corresponding faces of the lens.

The non-point light pattern reflected by lens 2 and the non-point light pattern reflected by lens 2' can both derive from, or correspond to, said predefined non-point light pattern 15. It can be understood that although deriving from same source, the non-point light patterns reflected on the lenses can differ one from the other because of the differing features (for instance position, orientation, geometry, optical features) of the corresponding lens.

According to a variant, a non-point light pattern reflected on the lenses can comprise, on the one hand, one element reflected by the lens corresponding to an element of the predefined non-point light pattern, and, on the other hand, another distinct element reflected by the other lens, that corresponds to another element of the predefined non-point light pattern. the distinct elements of the predefined non-point light pattern can provide from distinct sources.

Processing Unit

The processing unit 4 is configured for determining one or more features of the lens in function of one or more features of the reflected non-point light pattern 5.

The processing unit 4 can include a processor (or controller) and a memory storing a computer program (computer instructions) adapted to be executed by the processor.

Features determined by the processing unit 4 can include the contour and the shape of one or both faces of the lens. Other features can also be determined as explained below. According to embodiments the processing unit is configured for automatically digitizing the contour and/or the shape of at least one face of said at least one lens.

Mobile Device

According to embodiments, the system can be included in a mobile device. The non-point light pattern generating device 1 can comprise a backlit display and the image acquisition device 3 can include a camera embedded in the mobile device.

For instance, the mobile device can be a smartphone, a tablet, a laptop or similar, that includes a camera, a processor, a memory and a display screen.

Method

The system as disclosed above according to various embodiments can be used to execute a method for determining one or more features of one or both lenses mounted in a spectacle frame.

Figure 5:
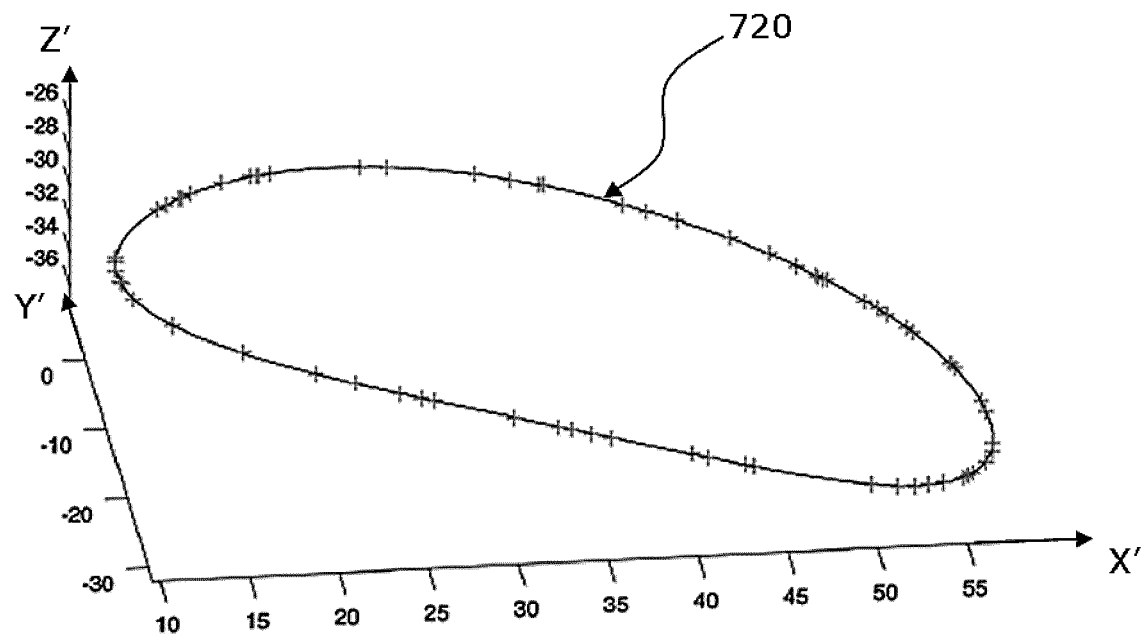
FIG. 5 is a 3D view of a contour of a lens that has been determined with a system according to one embodiment.
Figure 6:
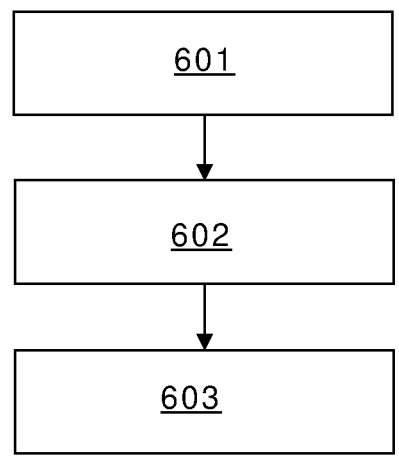
FIG. 6 is a flowchart illustrating steps of a method according to one embodiment.

A method according to one embodiment is illustrated at FIG. 6. At step 601, a predefined non-point light pattern 15 is generated. In the embodiments illustrated at FIGS. 1 to 5, the predefined non-point light pattern 15 has a cross shape. The arrangement of the system and the spectacle frame makes said predefined non-point light pattern reflect on said at least one lens 2. As a result, a reflected non-point light pattern 5 appears on said at least one lens 2.

At step 602, an image 5000 of the spectacle frame 200 including an image 5005 of the reflected non-point light pattern 5, is acquired. The image can be memorized in a memory to be processed by the processing unit 4.

At step 603, the processing unit 4 analyzes one or more features of the image 5005 of the reflected non-point light pattern 5 and determines one or more features of one or both lenses mounted in a spectacle frame based on said analysis. Said analysis can include the comparison between features of the acquired image and features of the predefined non-point light pattern 15.

The processing unit 4 can determine the distance between a lens and the image acquisition device. Determined distance can be used to reliably compare dimensions of the reflected non-point light pattern with the original predefined non-point light pattern to determine features of one or both lenses. In a variant, the distance can be a predefined value stored in a memory of the system.

For instance, the distance is around one meter. The distance can be adapted so that a dimension (length or width) or size of the reflected non-point light pattern is larger than a corresponding dimension or size of the lens.

The acquired image 5000 can be processed in a blue color channel. Indeed, the blue color provides better contrast with the human skin that reflects more red light.

Examples of Determinable Features

Examples of features that can be determined by the processing unit 4 of the system are discussed below.

For determining the contour, the processing unit determines, on the acquired image 5000, pixels where the reflected non-point light pattern 5 ends or has a discontinuity. The coordinates of determined pixels correspond to the contour of the lens 2. An example of such a digital 3D contour 720 of a lens that has been determined using the system, is illustrated at FIG. 5 with coordinates in a referential X', Y', Z' of points.

Fourier descriptors that compute a discrete Fourier transform of a closed contour can be used to build the 3D contour digital file of the lens.

According to embodiments, points of the contour of a lens can be determined by moving the reflected non-point light pattern 5 on the lens as explained below.

The system can be used to determine the shape and/or dimensions of lens 2. To this end the processing unit 4 is configured for comparing the shape and/or dimensions of the image 5005 of the reflected non-point light pattern 5 with the shape and/or dimensions of the predefined non-point light pattern 15. The shape and/or dimensions of at least one face of said at least one lens 2 can then be determined in function of the result of the comparison.

According to embodiments where the non-point light pattern is reflected by lens 2 and by lens 2' of the spectacle frame 200, the processing unit 4 can be configured for determining relative position parameters of the two lenses of the spectacle frame 200 in function of one or more feature of the image 5005 of the reflected non-point light pattern. Said relative position parameters can include the wrap angle or the pantoscopic tilt of the lenses.

According to embodiments, the system includes a 3D optical head scanner. The 3D optical head scanner can be based on a passive technology such as a stereoscopic technology, and/or on an active technology that includes emission of light in the visible or invisible frequency field. The skilled man in the art can find information related to method and device using a 3D optical head scanner for instance in the article untitled "Device and method for precise repositioning of subjects for 3D Imaging of Head, Face, and Neck" by Richard C. Roth, Matthew DePauw and Andrew Hepner. Examples of 3D optical head scanner recommended for face digitalization include the system named faceSCAN III from company Breuckmann, and the system named Cyclops$^2$ from company InSpeck.

The processing unit 4 is configured to control the 3D optical head scanner to execute a first scanning operation of the head of an individual that does not wear the spectacle frame 200 to obtain a first image, and a second scanning operation of the head of the individual that wears the spectacle frame 200 to obtain a second image. The processing unit can then compare one or more features of the first and second images, and determine at least one feature related to the position of at least one eye of the individual relatively to the corresponding lens 2, 2' of the spectacle frame 200 in function of the comparison.

According to embodiments, the system comprises a device that makes the reflected non-point light pattern 5 move relatively to the lens 2 so as to take a plurality of positions. The image acquisition device 3 acquire a sequence of images corresponding to said plurality of positions. The processing unit 4 can thus determine a feature such as the contour of the lens by analyzing the reflected non-point light patterns in the sequence of images.

For instance, moving the reflected non-point light pattern 5 can be used to determine the edges of one or both lenses by identifying the positions where the reflected non-point light pattern 5 ends or is discontinuous. Determination of feature(s) related to the lens(es) can also include comparing the reflected non-point light patterns one with another, in the sequence of images.

Such device used to make the reflected non-point light pattern 5 move can comprise a robot, for instance a multi-axis robot. According to a variant, the reflected non-point light pattern 5 can be moved on the corresponding lens by moving the generated non-point light pattern at various positions on an illuminating display screen used as the non-point light pattern generating device.

Examples of Applications

Depending on the application, lens 2 can be a neutral demonstration lens or an ophthalmic lens, also called correcting lens.

The system can be used in an optical store to determine one or more features of a neutral lens 2 that is mounted on a spectacle frame that a customer has chosen. Indeed, once the spectacle frame is chosen, the operator has to get data related to the lenses of the spectacle frame to order ophthalmic lenses whose features are compatible not only with the ophthalmic corrections needed by the customer, but also with the features of the spectacle frame.

The system can also be used with ophthalmic lenses mounted in the chosen spectacle frame to check that the machined ophthalmic lenses fit with the spectacle frame. The system enables to check that the lenses reliably fit the spectacle frame. The system enables to detect a difference between real measured data of a machined ophthalmic lens and target data that can be the result of a mechanical constraint during mounting of the machined ophthalmic lens in the spectacle frame. For instance, the lens can have measured geometrical features that differ from the target ones, because the lens curvature differs from the one of the corresponding location in the spectacle frame.

The system enables to check that the curvature of the front and/or rear face of the machined ophthalmic lens corresponds to the target curvature. If needed, the throat of the corresponding location in the spectacle frame can be re-machined or a new lens with a more appropriate front and/or rear face can be ordered.

The system can also be used with ophthalmic lenses mounted in a spectacle frame already worn by the customer to determine ophthalmic corrections of the ophthalmic lenses or retrieve other data of said lenses. The system can also be used to determine other lens or spectacle frame related data, such as one or more surface features of one or both lenses.

Surface features can include:
color of reflection,
type of antireflection,
level of reflection,
integrity,
presence of scratches, and/or
cleanliness When a lens (or each lens) is provided with engraving, the system can also be used for verification of the positioning of the lens by locating the engraving that is used as a reference.

The system enables locating engraving by identifying a break and/or discontinuity in the reflection, as it does for scratches. Once the engraving has been located, the system can check the correct centering of the corresponding lens mounted in a spectacle frame worn by the customer with regard to the corresponding pupil of the customer, independently of the mounting operation of the corresponding lens in the frame.

For instance, if the shape of the lens is off center as a result of the machining process, the optician can remedy this by deforming the frame or adjusting nose pads. In this case, the mounting height and/or the mounting axis may not be correct, but the lens can however be correctly centered with regard to the corresponding pupil of the customer.

According to embodiments and as illustrated at FIGS. 3 and 4, acquisition is made in a configuration wherein the spectacle frame, with its lenses, is worn by an individual.

During image acquisition, the individual keeps his head in a normal anatomical posture, referred as an orthostatic position, a position in which least effort is required. The normal anatomical posture of the wearer's head corresponds to the position of the wearer's head in three dimensions for which Frankfurt's plane of the wearer's head lies in a horizontal plane.

In a variant, acquisition of the image can be done in a configuration wherein the spectacles are held on a support, but without being worn by the individual.

Both configurations of acquisition can also be executed to compare the corresponding determined one or more features, since data, for instance the relative position or angle of the lenses, can differ from one configuration to the other.

Example of a Method for Calculating a Pupillary Distance and a Mounting Height

An example of a method for calculating a pupillary distance and a mounting height, that can be implemented a system as depicted, above is proposed below.

Measurement of the centering values for a wearer's spectacle frame can be impacted by the posture of the head and the position of the spectacle frame.

In particular, automatic measurement of the centering values based on the capture (acquisition) of an image of the wearer's head along with the spectacles can be impacted by the position of the head and the position of the spectacle frame.

Indeed, a rotation of the wearer's head on the vertical axis in the primary viewing position (headcap, to the right or to the left) has a direct effect on the pupillary distance values, and a bad position of the mount on the wearer's face can lead to a false measure of mounting height.

A method is proposed below to improve the measurement of the pupillary distance, especially in the case of asymmetry between the right eye and the left eye, and the mounting height.

This method makes it possible to reduce the errors of mounting height measurements that could result from a bad position of the spectacle frame on the wearer's head, and to manage differently the left and right asymmetries for the pupillary distance that could result from an asymmetry of the wearer's head, and to reduce the errors that could result from the wearer's position (headcap).

A purpose of this method is to minimize the occurrence of false automatic measurements that could result from a bad wearer's position (posture) or a bad adjustment of the spectacle frame. The method is based on the automatic measurement of head tilt (headcap) and pupillary distances (or pupillary half-distances). Three cases can occur.

First case: If there is no rotation of the head in the primary viewing position (headcap equal to zero or lower than a threshold for example two degrees) and if there is asymmetrical monocular pupillary distances (difference between distance "EPOD" and distance "EPOG" is greater than a threshold for example 0.5 millimeter or 1 millimeter), then the pupillary distance measurements are monocular pupillary distances (or pupillary half-distances). Note that distance "E POD" is the distance between the center of the right iris (or right pupil) and the center of the nose (or nasal bridge), and that distance "EPOG" is the distance between the center of the left iris (or left pupil) and the center of the nose (or nasal bridge).

Second case: If there is no rotation of the head in the primary viewing position (headcap equal to zero or lower than a threshold for example two degrees) and if there is symmetrical monocular pupillary distances (difference between distance "EPOD" and distance "EPOG" is equal to zero or inferior to a threshold for example 0.5 millimeter or 1 millimeter), then the measurement of pupillary distances is the binocular pupillary distance divided by 2. In other words, this second case can correspond to EPOD=EPOG= (Total distance between iris centers (or pupil centers))/2.

Third case: If there is a rotation of the head at the primary viewing position (headcap greater than a threshold for example two degrees), then the measurement of the pupillary distances is the pupil distance divided by 2. In other words, this third case can correspond to EPOD=EPOG= (Total distance between iris centers)/2.

A method for determining the mounting height can be as follow with different cases.

Case a. If the heights between the center of the iris (or the pupil) of each eye and the lower limit of the lenses are asymmetrical, that is to say, if the difference between heights is superior to a threshold, for example 1 millimeter or 1.5 millimeter, then the optician or operator is asked to review the fit (adjustment) and position of the spectacle frame on the wearer's head. In other words, this case can be formulated in the following way:

If (FH OD−FH OG)>predefined threshold (for instance 1.5 millimeter), then review the fit (adjustment) and position of the spectacle frame, FH OD being the height between the center of the iris (or the pupil) of right eye and the lower limit of the lens, and FH OG being the height between the center of the iris (or the pupil) of left eye and the lower limit of the lens.

Case a1. If the adjustment and position of the spectacle frame is validated:
then the measurement can be redone, and is correct.

Case a2. If the adjustment and the position of the spectacle frame are not validated, then the measurement has to be redone.

Case b. If the heights between the center of the iris (or pupil) of each eye and the lower limit of the lens are symmetrical, that is to say if the difference between heights is equal to zero or inferior to a threshold, for example 1 millimeter or 1.5 millimeters, then the measurement is validated.

The above-described functions and steps may be implemented in the form of a computer program or via hardware components (e.g. programmable gate arrays). The functions and the steps performed by the processing unit, the image acquisition device and the non-point light pattern generating device may be performed or controlled by sets of computer instructions or modules implemented by a processor or a controller or they may be performed by dedicated electronic components of the field-programmable gate array (FPGA) or application-specific integrated circuit (ASIC) type. It is also possible to combine computer parts and electronic parts.

The computer programs, or computer instructions, may be contained in program storage devices, e.g. computer-readable digital data storage media, or executable programs. The programs or instructions may also be executed from program storage peripherals.

Although representative processes and articles have been described in detail herein, those skilled in the art will recognize that various substitutions and modifications may be made without departing from the scope of what is described and defined by the appended claims.

The invention claimed is:

1. A system for determining at least one feature of at least one lens mounted in a spectacle frame, said system comprising:
a non-point light pattern generating device configured to generate a predefined non-point light pattern, and arranged to have said predefined non-point light pattern reflected on said at least one lens;
an image acquisition device configured to acquire an image of the spectacle frame including an image of the reflected non-point light pattern; and
processing circuitry configured to determine at least a contour of said at least one lens in function of at least one feature of the image of the reflected non-point light pattern, wherein the processing circuitry is configured to
compare the image of the reflected non-point light pattern with the predefined non-point light pattern to identify a discontinuity or rupture in the reflected non-point light pattern, and
determine said contour of said at least one lens by identifying a location of the discontinuity or rupture in the reflected non-point light pattern.

2. The system of claim 1, wherein said at least one feature of said at least one lens is at least one parameter among a group of parameters comprising a geometrical parameter, an optical parameter, and a fitting parameter.

3. The system of claim 1, wherein the predefined non-point light pattern is a cross.

4. The system of claim 1, wherein the predefined non-point light pattern has a closed shape.

5. The system of claim 1, wherein the predefined non-point light pattern has at least one extremity or outer surface whose color differs from another part of the predefined non-point light pattern.

6. The system of claim 1, wherein the processing circuitry is configured to:
compare a shape of the image of the reflected non-point light pattern with a shape of the predefined non-point light pattern, and
determine a shape of at least one face of said at least one lens in function of a result of the comparison.

7. The system of claim 1, wherein, the non-point light pattern is reflected by said at least one lens and by another lens of the spectacle frame, and
the processing circuitry is configured to determine at least one relative position parameter of the two lenses in function of at least one feature of the image of the reflected non-point light pattern.

8. The system of claim 1, further comprising a 3D optical head scanner, wherein
the processing circuitry is configured to control the 3D optical head scanner to execute:
a first scanning operation of the head of an individual that does not wear the spectacle frame to acquire a first image, and
a second scanning operation of the head of the individual that wears the spectacle frame to acquire a second image, and
the processing circuitry is configured to determine at least one feature related to a position of at least one eye of the individual relatively to the corresponding lens of the spectacle frame in function of the first and second images.

9. A mobile device that includes the system according to claim 1.

10. A method for determining at least one feature of at least one lens mounted in a spectacle frame, said method comprising:
generating a predefined non-point light pattern;
making said predefined non-point light pattern reflect on said at least one lens;
acquiring an image of the spectacle frame including an image of the reflected non-point light pattern; and
determining, with processing circuitry, at least one feature of said at least one lens in function of at least one feature of the image of the reflected non-point light pattern, wherein
the determining at least one feature of said at least one lens includes
comparing the image of the reflected non-point light pattern with the predefined non-point light pattern to identify a discontinuity or rupture in the reflected non-point light pattern, and determining a contour of said at least one lens by identifying a location of the discontinuity or rupture in the reflected non-point light pattern.

11. The method of claim 10, wherein the determining at least one feature of said at least one lens includes determining a shape of said at least one lens.

12. The method of claim 10, wherein the method is executed in a configuration wherein the spectacle frame is worn by an individual.

13. The method of claim 10, further comprising moving the non-point light pattern that is reflected by said at least one lens, according to a predefined path relatively to said at least one lens of the spectacle frame, so that the reflected non-point light pattern takes a plurality of positions over time, and acquiring a plurality of said image of the spectacle frame including an image of the reflected non-point light pattern, according to said plurality of positions of the reflected non-point light pattern.

14. A non-transitory computer-readable carrier medium storing a program which, when executed by a computer, causes the computer to carry out a method comprising:

generating a predefined non-point light pattern;

making said predefined non-point light pattern reflect on said at least one lens;

acquiring an image of a spectacle frame including an image of the reflected non-point light pattern; and determining, with processing circuitry, at least one feature of said at least one lens in function of at least one feature of the image of the reflected non-point light pattern, wherein the determining at least one feature of said at least one lens includes comparing the image of the reflected non-point light pattern with the predefined non-point light pattern to identify a discontinuity or rupture in the reflected non-point light pattern, and determining a contour of said at least one lens by identifying a location of the discontinuity or rupture in the reflected non-point light pattern.

* * * * *